(12) United States Patent
Koh et al.

(10) Patent No.: US 11,849,005 B2
(45) Date of Patent: Dec. 19, 2023

(54) METHOD AND APPARATUS FOR ACCELERATING NETWORK TRANSMISSION IN MEMORY-DISAGGREGATED ENVIRONMENT

(71) Applicants: ELECTRONICS AND TELECOMMUNICATIONS RESEARCH INSTITUTE, Daejeon (KR); SYSGEAR CO., LTD., Seoul (KR)

(72) Inventors: Kwang-Won Koh, Daejeon (KR); Kang-Ho Kim, Daejeon (KR); Chang-Dae Kim, Daejeon (KR); Tae-Hoon Kim, Daejeon (KR); Sang-Ho Eom, Seoul (KR)

(73) Assignees: ELECTRONICS AND TELECOMMUNICATIONS RESEARCH INSTITUTE, Daejeon (KR); SYSGEAR CO., LTD., Seoul (KR)

( * ) Notice: Subject to any disclaimer, the term of this patent is extended or adjusted under 35 U.S.C. 154(b) by 0 days.

(21) Appl. No.: 18/076,051

(22) Filed: Dec. 6, 2022

(65) Prior Publication Data

US 2023/0179679 A1  Jun. 8, 2023

(30) Foreign Application Priority Data

Dec. 6, 2021 (KR) .................. 10-2021-0173192
Nov. 21, 2022 (KR) .................. 10-2022-0156303

(51) Int. Cl.
*H04L 67/568* (2022.01)
*G06F 9/455* (2018.01)
*H04L 67/60* (2022.01)

(52) U.S. Cl.
CPC ........ *H04L 67/568* (2022.05); *G06F 9/45558* (2013.01); *H04L 67/60* (2022.05); *G06F 2009/45595* (2013.01)

(58) Field of Classification Search
None
See application file for complete search history.

(56) References Cited

U.S. PATENT DOCUMENTS

| | | |
|---|---|---|
| 9,998,558 B2 | 6/2018 | Sammatshetti |
| 10,114,763 B2 * | 10/2018 | Stabrawa .............. G06F 3/0631 |
| 10,691,365 B1 | 6/2020 | Tsirkin et al. |
| 10,754,547 B2 | 8/2020 | Kim et al. |

(Continued)

FOREIGN PATENT DOCUMENTS

KR  10-2017-0007103  1/2017

*Primary Examiner* — Jeffrey R Swearingen
(74) *Attorney, Agent, or Firm* — KILE PARK REED & HOUTTEMAN PLLC (57) ABSTRACT

Disclosed herein are a method and apparatus for accelerating network transmission in a memory-disaggregated environment. The method for accelerating network transmission in a memory-disaggregated environment includes copying transmission data to a transmission buffer of the computing node, when a page fault occurs during copy of the transmission data, identifying a location at which the transmission data is stored, setting a node in which a largest amount of transmission data is stored as a transmission node, and sending a transmission command to the transmission node.

16 Claims, 12 Drawing Sheets

(56) References Cited

U.S. PATENT DOCUMENTS

| | | |
|---|---|---|
| 10,789,090 B2 | 9/2020 | Koh et al. |
| 11,126,461 B2 | 9/2021 | Doudali et al. |
| 2019/0235904 A1 | 8/2019 | Epping et al. |
| 2023/0104845 A1* | 4/2023 | Ray .................... G06F 12/0842 |
| | | 711/126 |

* cited by examiner

| MEMORY CONFIGURATION INFORMATION (MEMORY SERVER INFORMATION, LENGTH) | ... | COMPUTING NODE IP ADDRESS | DATA (COMPUTING NODE) |
|---|---|---|---|

METHOD AND APPARATUS FOR ACCELERATING NETWORK TRANSMISSION IN MEMORY-DISAGGREGATED ENVIRONMENT

CROSS REFERENCE TO RELATED APPLICATIONS

This application claims the benefit of Korean Patent Application Nos. 10-2021-0173192, filed Dec. 6, 2021 and 10-2022-0156303, filed Nov. 21, 2022, which are hereby incorporated by reference in their entireties into this application.

BACKGROUND OF THE INVENTION

1. Technical Field

The present disclosure relates generally to technology for accelerating network transmission in a memory-disaggregated environment.

More particularly, the present disclosure relates to technology for improving the efficiency of network transmission by overcoming inefficiency occurring in the case where data is located in remote memory.

2. Description of the Related Art

In a memory disaggregation system, data requiring fast memory access is located in local Dynamic Random Access Memory (DRAM) present in a host on which a virtual machine is operating, and the remaining data is located in remote memory or the like, and thus high memory access performance may be obtained, and memory having larger capacity than that of DRAM controlled by a computer memory sub-system may be provided. That is, arbitrary data may be located in local DRAM or remote memory depending on the access properties thereof.

A memory cache service, which is one of representative services used in cloud infrastructure, transmits information recorded in memory over a network in response to a client request. This occasionally shows the case where locality strongly appears depending on the data request pattern of a client, but also shows the case where locality hardly appears. In order for a virtual machine system that uses remote memory to support such a service, a memory disaggregation system needs to provide service corresponding to data requested by a client through a virtual machine node.

Here, in the case where the corresponding data is located in the local DRAM, the data may be rapidly transmitted over the network. In contrast, when the request data is located in remote memory, the virtual machine node accesses the remote memory, and loads the request data from the remote memory into local memory through a disaggregated memory manager, after which the request data needs to be transmitted over the network. Because this process is accompanied by a procedure for requesting loading of a memory block including the data to be transmitted to the network and loading the data from a remote memory server into the local DRAM, a delay time on a network request is increased, and it is difficult to sufficiently use a network bandwidth.

When the data transmitted in this way is continuously required by a client, the disaggregated memory manager continues to locate the data in the local DRAM. However, when the corresponding data is not re-requested by the client, the data may be re-written to the remote memory as the memory disaggregation system accesses the remote memory, or may be deleted from the local DRAM. In particular, an application such as a memory cache served over the network may deteriorate the reusability and locality of target data present in memory, thus causing a phenomenon in which a memory block meaningfully used in the local DRAM is evicted into the remote memory.

PRIOR ART DOCUMENTS

Patent Documents (Patent Document 1) Korean Patent Application Publication No. 10-2017-0007103 (Title: Method for Implementing RDMA NVMe Device)

SUMMARY OF THE INVENTION

Accordingly, the present disclosure has been made keeping in mind the above problems occurring in the prior art, and an object of the present disclosure is to provide a short delay time and a wide network transmission bandwidth in a memory-disaggregated environment.

Another object of the present disclosure is to improve the utilization of local memory in a memory-disaggregated environment.

In accordance with an aspect of the present disclosure to accomplish the above objects, there is provided a method for accelerating network transmission, the method accelerating network transmission in a memory-disaggregated environment including a computing node, on which a virtual machine is running, and a memory node, the method including copying transmission data to a transmission buffer of the computing node, when a page fault occurs during copy of the transmission data, identifying a location at which the transmission data is stored, setting a node in which a largest amount of transmission data is stored as a transmission node, and sending a transmission command to the transmission node.

The transmission command may include at least one of transmission data stored in a local memory of the computing node, configuration information of the transmission data, or an IP address of the computing node, or a combination thereof.

The transmission node may request the transmission data from an additional node in which the transmission data is stored by utilizing the configuration information of the transmission data, and may send complete transmission data.

The transmission node may change a transmitter IP address to the IP address of the computing node, and may then send the transmission data to the IP address of the computing node.

When the transmission node corresponds to the computing node, the transmission node may receive the transmission data from the memory node, and sends the complete transmission data.

The configuration information of the transmission data may include information about a node in which the transmission data is stored, and information about pieces of transmission data for respective nodes.

In accordance with another aspect of the present disclosure to accomplish the above objects, there is provided a computing node in a memory-disaggregated environment, including a virtual machine network kernel module configured to copy transmission data to a transmission buffer, a disaggregated memory management module configured to, when a page fault occurs during copy of the transmission data, identify a location at which the transmission data is stored in the memory-disaggregated environment, an offloading module configured to set a node, in which a largest amount of transmission data is stored between a computing node and a memory node, as a transmission node, and a communication module configured to send a transmission command to the transmission node.

The transmission command may include at least one of transmission data stored in local memory, configuration information of the transmission data or an IP address of the computing node, or a combination thereof.

The transmission command may control the transmission node to request the transmission data from an additional node in which the transmission data is stored by utilizing the configuration information of the transmission data and to send complete transmission data.

The transmission command may control the transmission node to change a transmitter IP address to the IP address of the computing node, and then to transmit the transmission data to the IP address of the computing node.

When the transmission node corresponds to the computing node, the communication module may receive the transmission data from the memory node, and may send the complete transmission data.

The configuration information of the transmission data may include information about a node in which the transmission data is stored, and information about pieces of transmission data for respective nodes.

In accordance with a further aspect of the present disclosure to accomplish the above objects, there is provided a memory node in a memory-disaggregated environment, including a communication module configured to receive a transmission command from a computing node on which a virtual machine is running, and send transmission data in response to the transmission command, and a disaggregated memory network server configured to configure complete transmission data using configuration information of the transmission data, wherein the transmission command includes at least one of transmission data stored in a local memory of the computing node, configuration information of the transmission data, or an IP address of the computing node, or a combination thereof.

The transmission command may be received in a case where a largest amount of transmission data is stored in the memory node.

The communication module may request the transmission data from an additional node in which the transmission data is stored, by utilizing the configuration information of the transmission data.

The memory node may further include an IP spoofing module configured to change a transmitter IP address to the IP address of the computing node.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, embodiments of the present disclosure will be described in detail with reference to the accompanying drawings. In the following description of the present disclosure, the same reference numerals are used to designate the same or similar elements throughout the drawings and repeated descriptions of the same components will be omitted.

Multiple applications executed in a cloud data center provide an execution service by a user or an application logic server over a network. For such applications, the average of a service response time (i.e., service latency) required to receive a response from the time of a request is important, but another principal performance factor is tail latency. It is important to maintain the tail latency at a short time so as to guarantee uniform quality of service.

That is, in an environment in which a group of the longest latencies, among various response times (latencies), is the principal performance, a memory disaggregation system is configured such that a memory block is located in remote memory, and thus the memory block is loaded into a computing node and a service for the memory block is then provided. Because such a service has low locality, access to the remote memory frequently occurs, thus causing long tail latency, with the result that the scenario of application of the service is limited.

The present disclosure accelerates network transmission by considering the location of a memory server for data to be transmitted over a network in the memory disaggregation system and by off loading network transmission to the corresponding server upon performing a network service. This shows that responses to multiple requested services are directly provided by multiple memory nodes, thus providing a wider network bandwidth when only a single computing node provides the service. Therefore, multiple memory servers other than a concentrated node directly provide the service over the network in a memory-disaggregated environment, thus preventing tail latency from greatly increasing.

Figure 1:
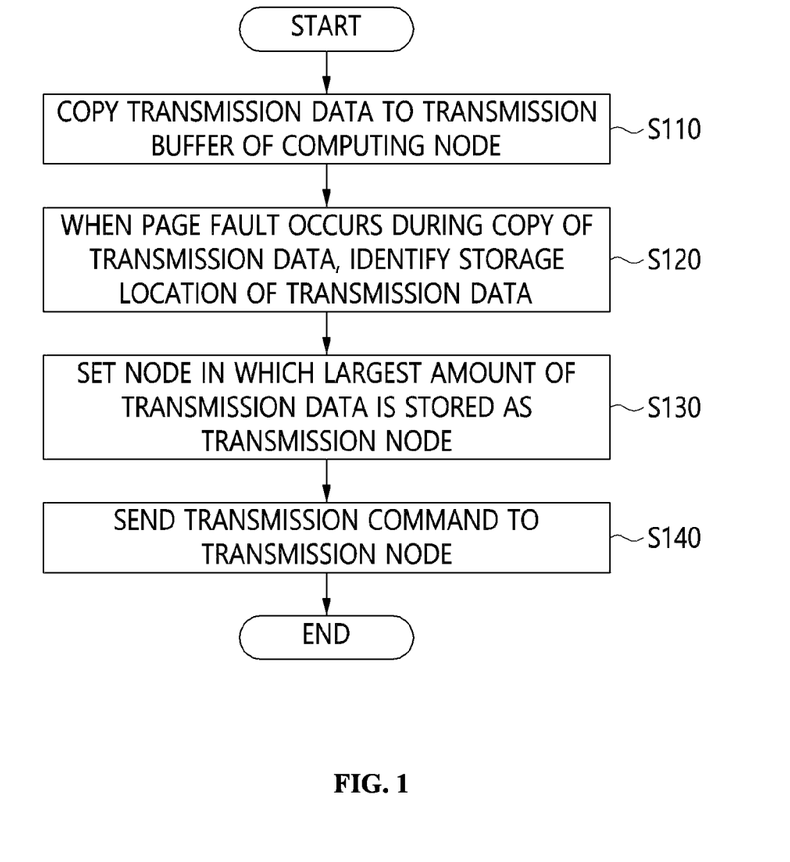
FIG. 1 is a flowchart illustrating a method for accelerating network transmission in a memory-disaggregated environment according to an embodiment of the present disclosure.

FIG. 1 is a flowchart illustrating a method for accelerating network transmission in a memory-disaggregated environment according to an embodiment of the present disclosure.

The method for accelerating network transmission according to the embodiment of the present disclosure may be performed by an apparatus for accelerating network transmission, such as a computing node.

Referring to FIG. 1, the method for accelerating network transmission in a memory-disaggregated environment according to the embodiment of the present disclosure may include step S110 of copying transmission data to a transmission buffer of the computing node, step S120 of, when a page fault occurs during the copy of the transmission data, identifying the storage location of the transmission data, step S130 of setting a node in which a largest amount of transmission data is stored as a transmission node, and step S140 of sending a transmission command to the transmission node.

Here, the transmission command may include at least one of transmission data stored in local memory of the computing node, configuration information of the transmission data, or the IP address of the computing node, or a combination thereof.

Here, the transmission node may request the transmission data from an additional node in which the transmission data is stored by utilizing the configuration information of the transmission data, and may then transmit complete transmission data.

Here, the transmission node may change a transmitter (source) IP address to the IP address of the computing node, and then transmit the transmission data to the IP address.

Here, when the transmission node corresponds to the computing node, the transmission node may receive the transmission data from the memory node, and may transmit the complete transmission data.

Here, the configuration information of the transmission data may include information about a node in which the transmission data is stored and information about pieces of transmission data for respective nodes.

Figure 2:
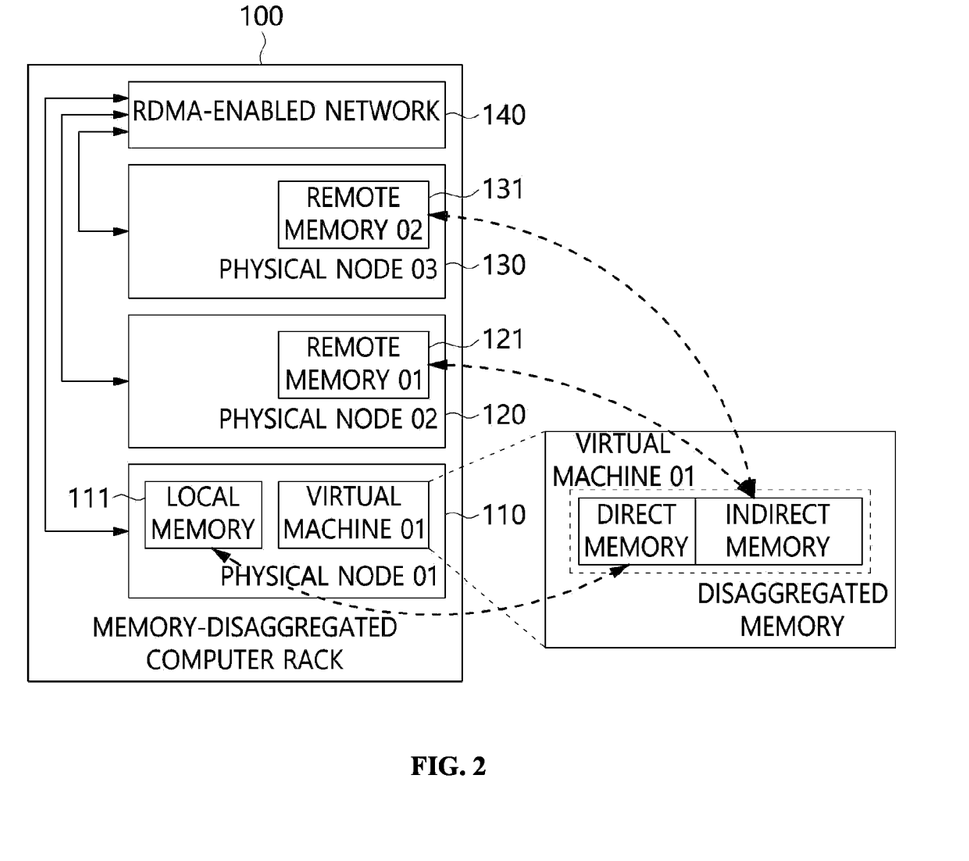
FIG. 2 illustrates an example of a method for allocating memory resources used in a memory disaggregation system.

FIG. 2 illustrates an example of a method for allocating memory resources used in a memory disaggregation system.

Referring to FIG. 2, virtual machine 01 is running on physical node 01 110, and uses, as direct memory, local memory 111 located in the physical node 01 110. Further, as indirect memory, remotely accessible memories 121 and 131 that are located in physical node 02 120 and physical node 03 130 are used. This means that data sensitive to performance is located in the local memory 111, and data less sensitive to performance is allocated to the remote memory, and thus a large-capacity memory use environment is provided while high performance is obtained.

In this way, a single virtual machine that is running by utilizing memory over several nodes may be created, and thus high flexibility and high resource utilization may be expected compared to existing virtual machine technologies which utilize only memory resources present in a single physical node.

Figure 3:
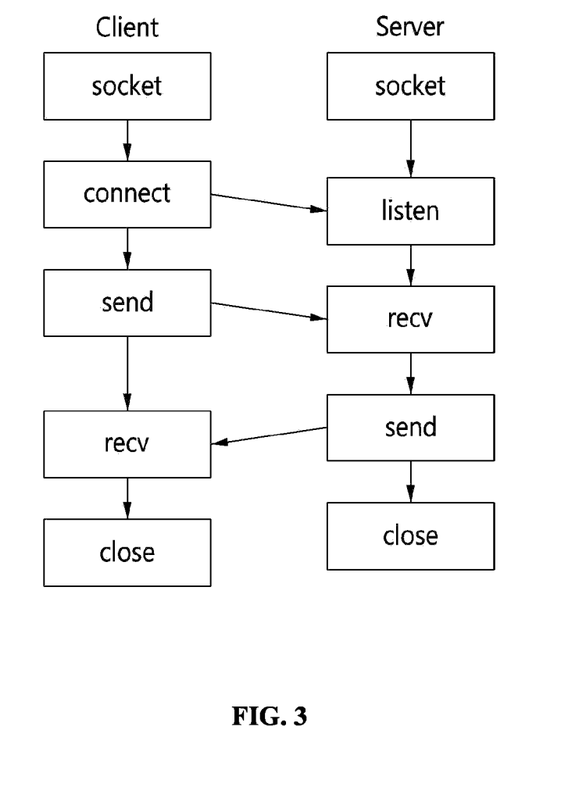
FIG. 3 is a flowchart illustrating the order of communication between an application client and a server.

FIG. 3 is a flowchart illustrating the order of communication between an application client and a server.

Figure 4:
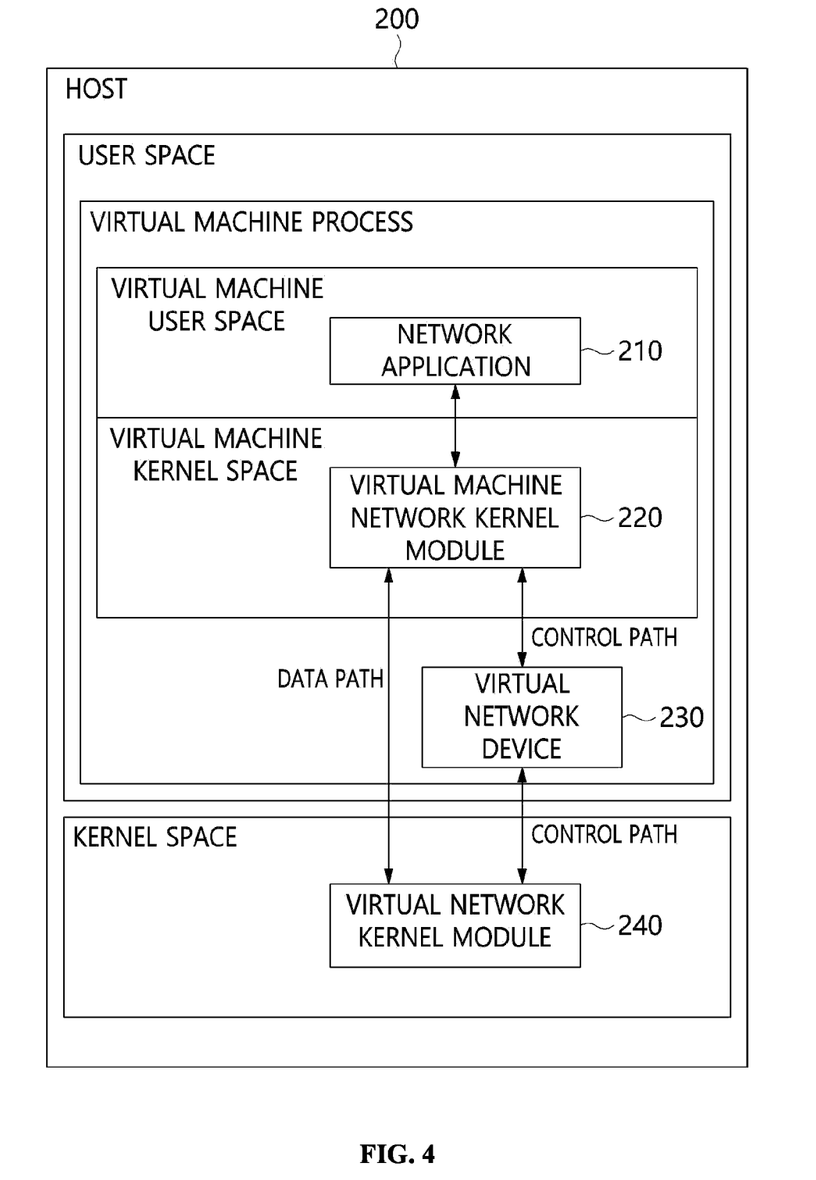
FIG. 4 illustrates a network transmission structure for a virtual machine.

FIG. 4 illustrates a network transmission structure for a virtual machine.

Referring to FIG. 3, the client is coupled to a waiting server by executing a listen operation through a connect function. Thereafter, the client and the server exchange required information with each other using send/recv functions. As illustrated in FIG. 4, the send function executed in a network application 210 requests data from a virtual machine network kernel module 220 using a system call. In this case, the virtual machine network kernel module 220 copies data requested by the network application 210 to a buffer allocated from the corresponding system. The data stored in the allocated buffer may be transferred to a virtual network device 230 without requiring additional copying, and may then be transferred to a virtual network kernel module 240. Therefore, the data may be finally transmitted to the network through a network device.

Here, the virtual machine network kernel module 220 is connected to the virtual network kernel module 240 through the virtual network device 230, but the scope of the present disclosure is not limited thereto. That is, the present disclosure may be applied to various data paths, such as OpenVSwitch or vhost-user, which transfers data to a physical network interface, but the present disclosure is described based on the virtual machine network kernel module installed in a virtual machine kernel space.

Figure 5:
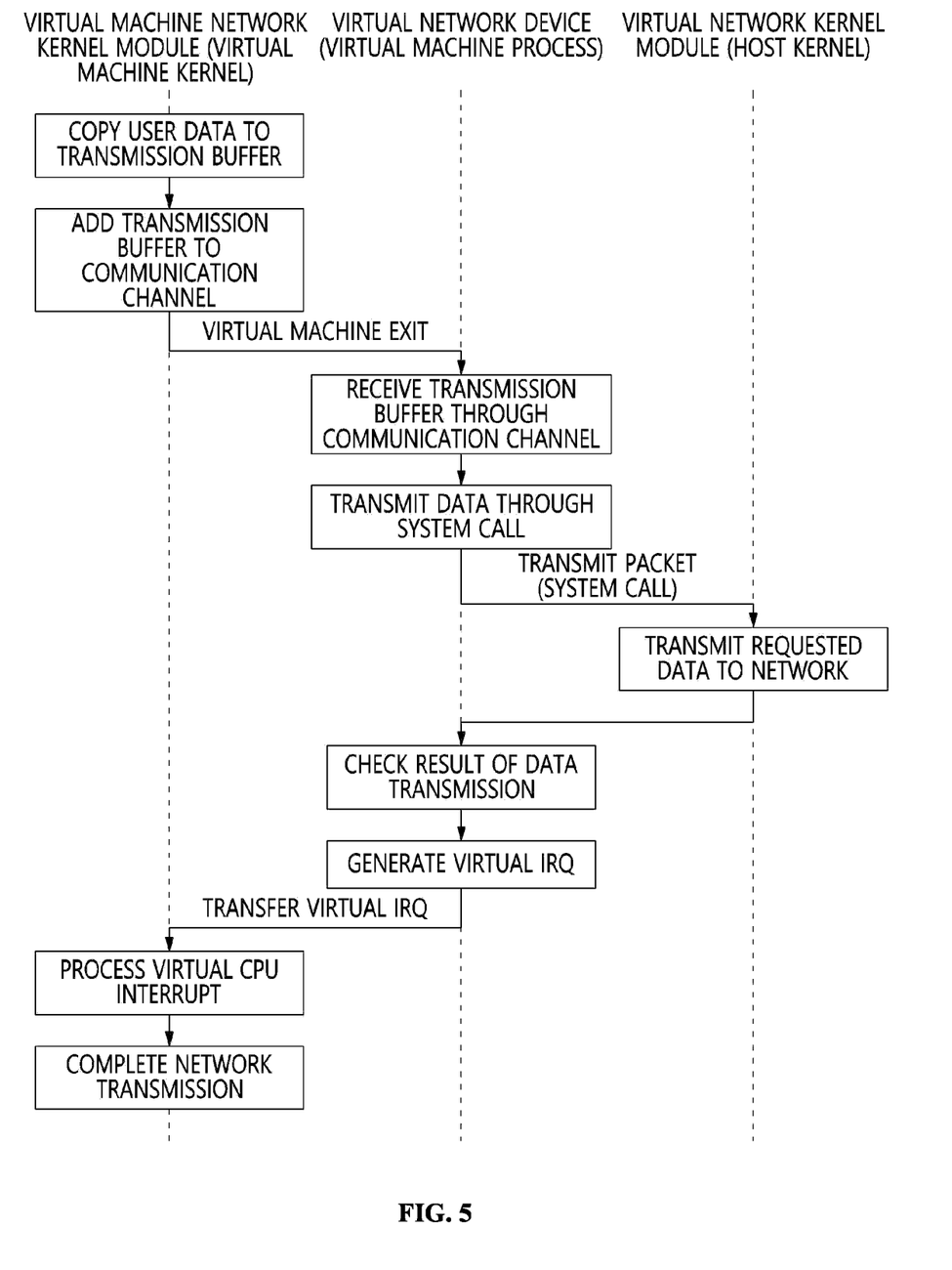
FIG. 5 illustrates the flow of data in network transmission for a virtual machine.

FIG. 5 illustrates the flow of data in network transmission for a virtual machine.

Referring to FIG. 5, data requested by a user is copied to a transmission buffer in a virtual machine network kernel module, and is transferred to a virtual network kernel module through a virtual network device, whereby the requested data is transmitted to a network. The results of transmission are transferred to a virtual CPU through a virtual Interrupt Request (IRQ) or the like.

Figure 6:
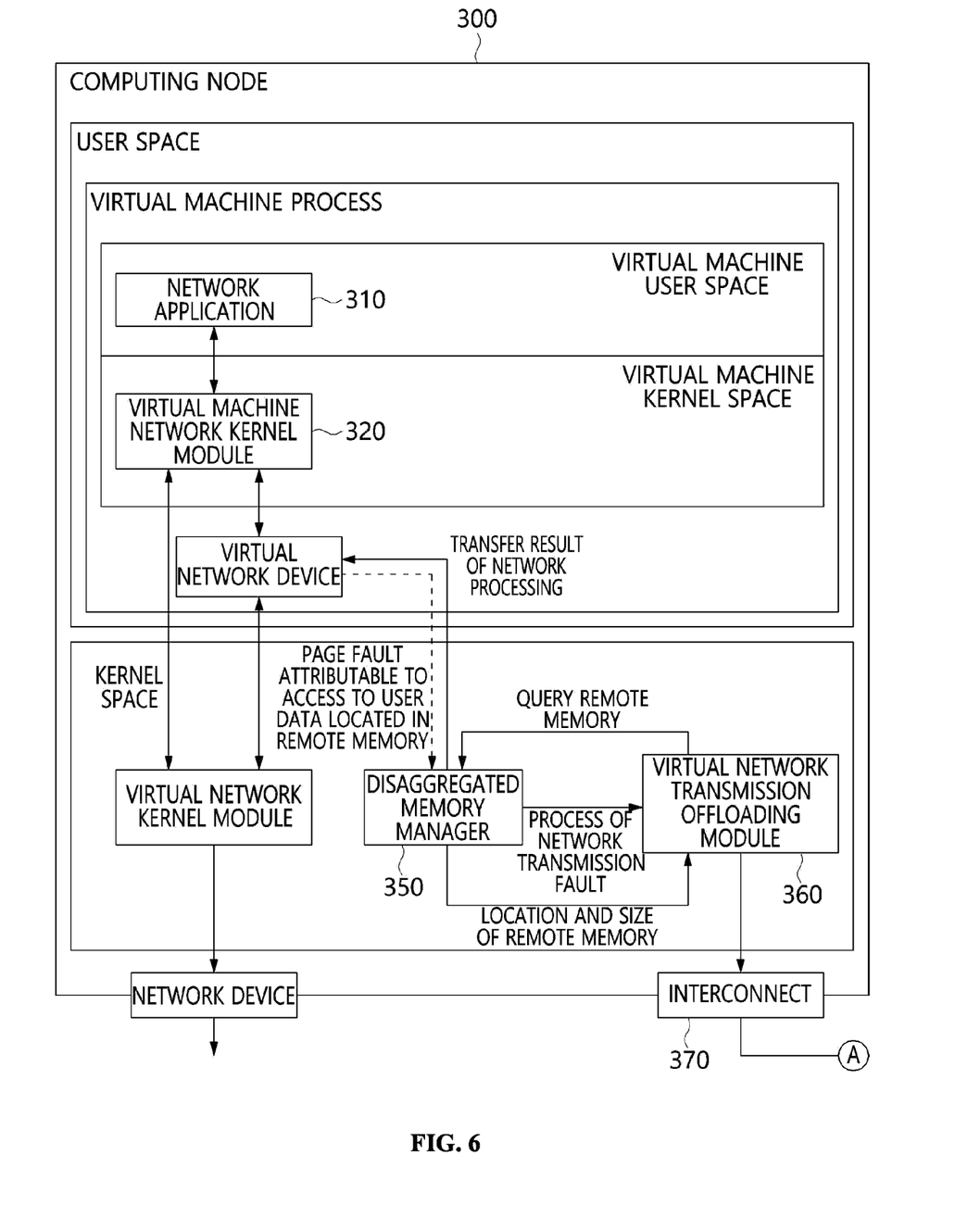
FIGS. 6 and 7 are block diagrams illustrating the structure of a system for accelerating network transmission according to an embodiment of the present disclosure.
Figure 7:
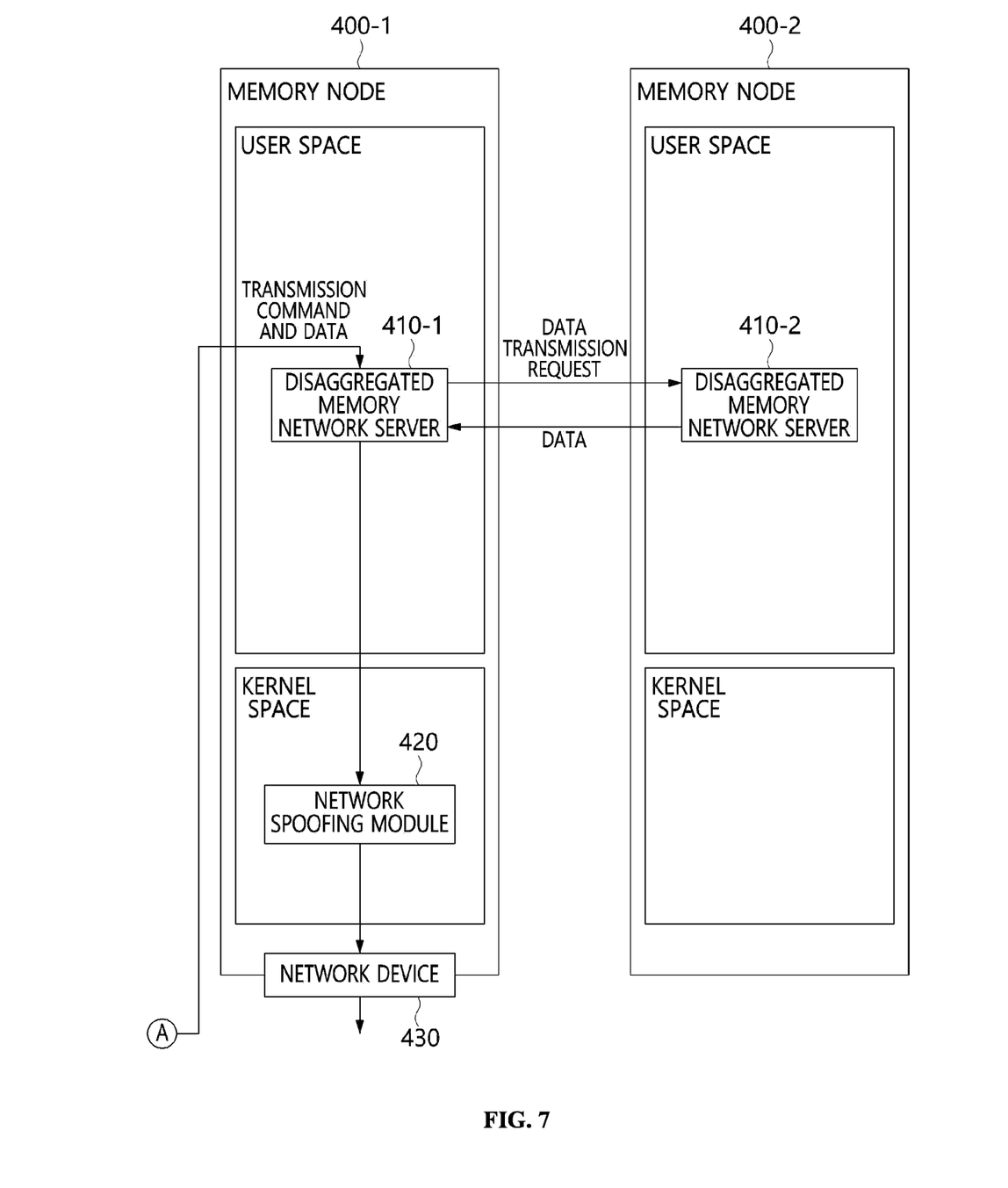

FIGS. 6 and 7 are block diagrams illustrating the structure of a system for accelerating network transmission according to an embodiment of the present disclosure.

Referring to FIGS. 6 and 7, a virtual machine network kernel module 320 is allocated a buffer for network transmission in response to a request received from a network application 310, copies data to be transmitted from an address requested by the network application 310 to the buffer, and notifies a virtual network device of the copy of the data, whereby network transmission is performed. When a page or a memory block, including the data requested by the network application 310 from the virtual machine network kernel module 320, is located in a remote memory node, memory access occurs due to such copy, which causes a page fault and then enables control to be handed over to a disaggregated memory manager 350. Here, when memory in which data desired to be transmitted by the network application is completely stored is located in local DRAM, the data is transmitted to the network using the virtual network device without requiring additional cost.

The disaggregated memory manager 350 identifies the location where the page fault occurs, determines that the corresponding page fault has occurred in the virtual machine network kernel module, and then hands over control to a virtual network transmission offloading module 360, to which fault processing for network transmission is to be delegated. Here, the virtual network transmission offloading module 360 queries about the remote memory node in which data desired to be transmitted is located through the disaggregated memory manager 350, and identifies the location of the remote memory node in which required data is to be stored for network transmission.

The data to be transmitted may not be present in the computing node, or may be partially present, and may be located in one or more memory nodes. A principal policy is to transmit the data through a node having a largest amount of data. When a computing node has a largest amount of data related to user data desired to be transmitted, the computing node sends transmission data that has been completed with data received from the corresponding memory node through a network spoofing module. On the other hand, when an arbitrary memory node has a largest amount of data among pieces of data desired to be transmitted, the virtual network transmission offloading module 360 transmits a network transmission command, together with a part of transmission data located in the computing node, to the corresponding memory node 400-1 through an interconnect 370. The memory node having received the network transmission command and the part of the transmission data may request/receive data from an additional memory node 400-2 if necessary, and then generates complete transmission data.

A disaggregated memory network server 410-1 transmits a network packet through a network device 430 located in the memory node as if the network packet were transmitted from a virtual machine using disaggregated memory to the network, using a method such as source (transmitter) IP address spoofing, through a network transmission spoofing module 420 of the corresponding node. A receiving end having received the packet recognizes the source IP of the packet as the computing node, which is the virtual machine, and sends a response to the computing node.

Figure 8:
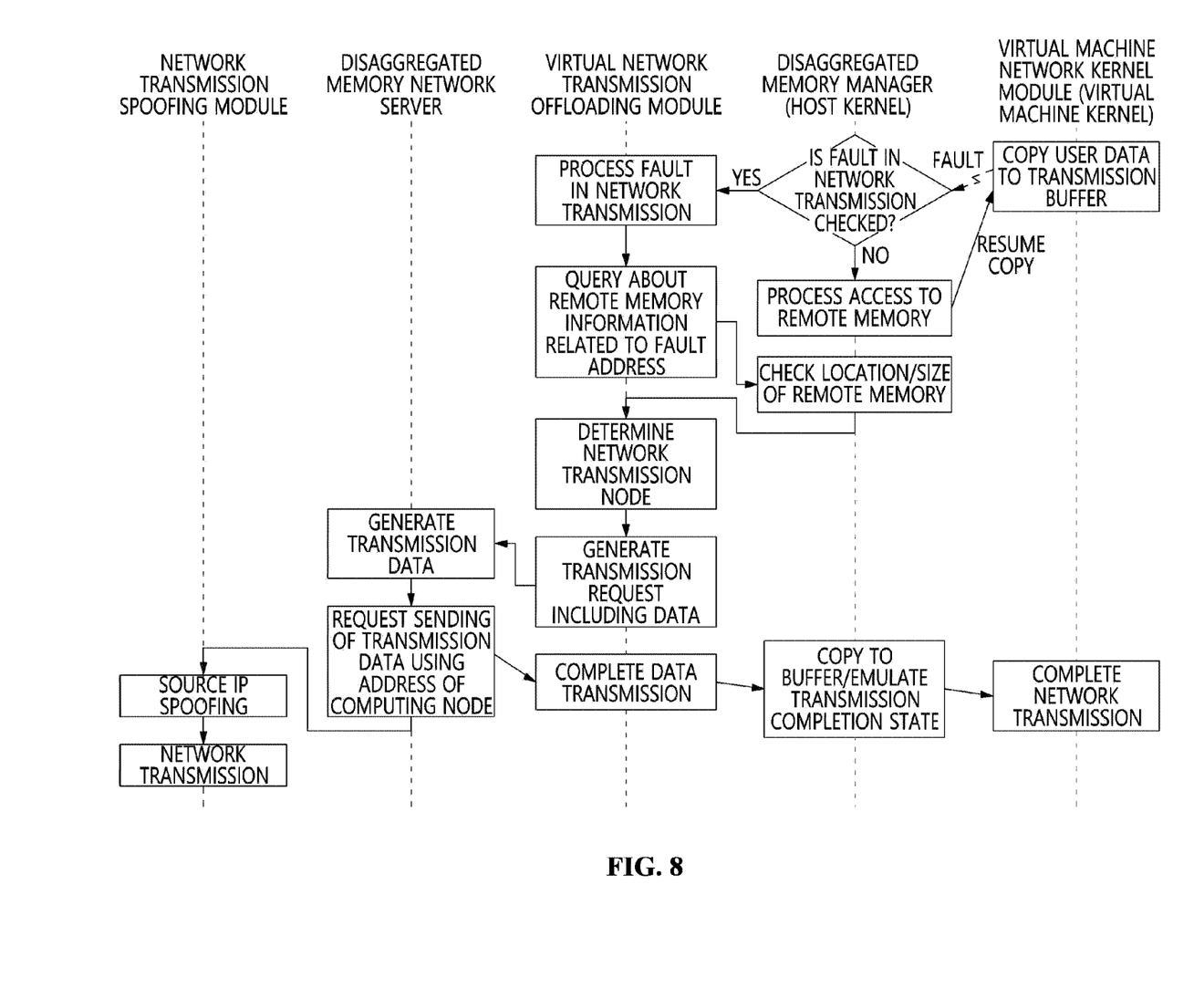
FIG. 8 is a flowchart illustrating a method for accelerating network transmission in a disaggregated memory virtual machine according to an embodiment of the present disclosure.

FIG. 8 is a flowchart illustrating a method for accelerating network transmission in a disaggregated memory virtual machine according to an embodiment of the present disclosure.

Referring to FIG. 8, in a virtual machine network kernel module, transmission data of a user program is first copied to a transmission buffer. Here, when the transmission data is located in remote memory, access to the remote memory occurs, whereby a page fault occurs, and control is handed over to a disaggregated memory manager. Here, when all of the transmission data is located in local DRAM, no fault occurs, and the transmission data is sent in the same manner as an existing virtual machine. Further, when a network transmission fault is not recognized, transmission is performed in the same manner as an existing disaggregated memory system.

First, when a fault in access to the remote memory in network transmission is identified, a virtual network transmission offloading module queries the disaggregated memory manager about remote memory information related to a fault address. The location information of data desired by a user to be transmitted in memory may be identified, and a node in which a largest amount of data is located is selected from among computing nodes or remote nodes.

Figure 9:
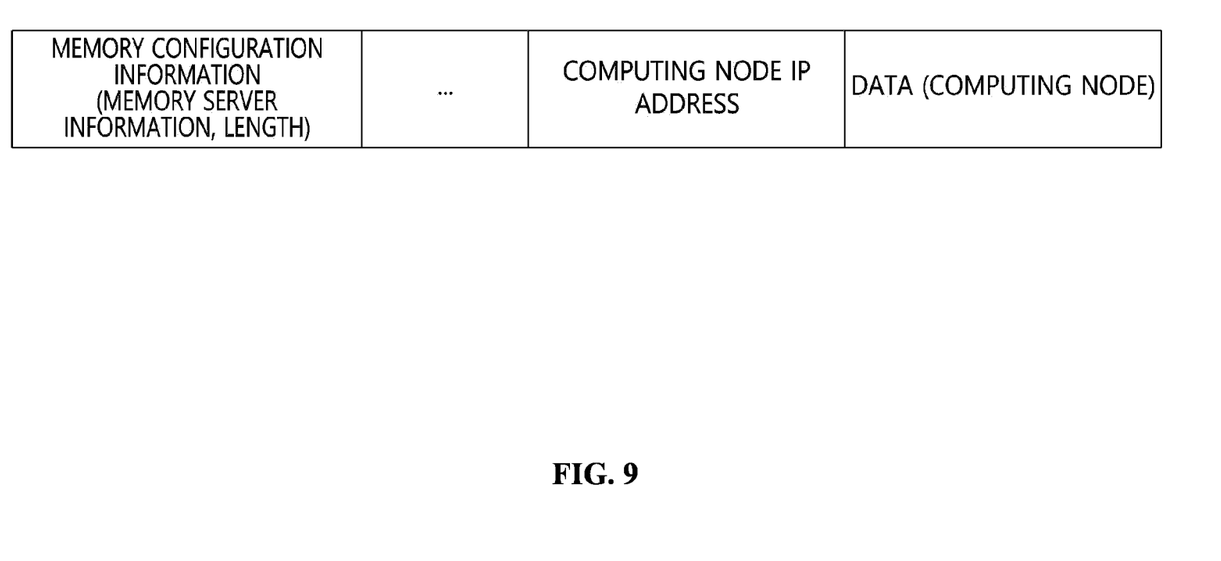
FIG. 9 illustrates an example of information transmitted to a disaggregated memory network server.

FIG. 9 illustrates an example of information transmitted to a disaggregated memory network server.

Here, as illustrated in FIG. 9, transmission to the disaggregated memory network server is requested using data configuration information, the IP address of a computing node, and data located in the computing node. Thereafter, the disaggregated memory network server checks data configuration information in transmission request information, requests/receives required data from other remote memory servers if necessary, and then generates complete transmission data by aggregating the corresponding information. Network transmission of the complete transmission data is performed using the address of the computing node, and notification of network transmission is provided to the virtual network transmission offloading module.

Figure 10:
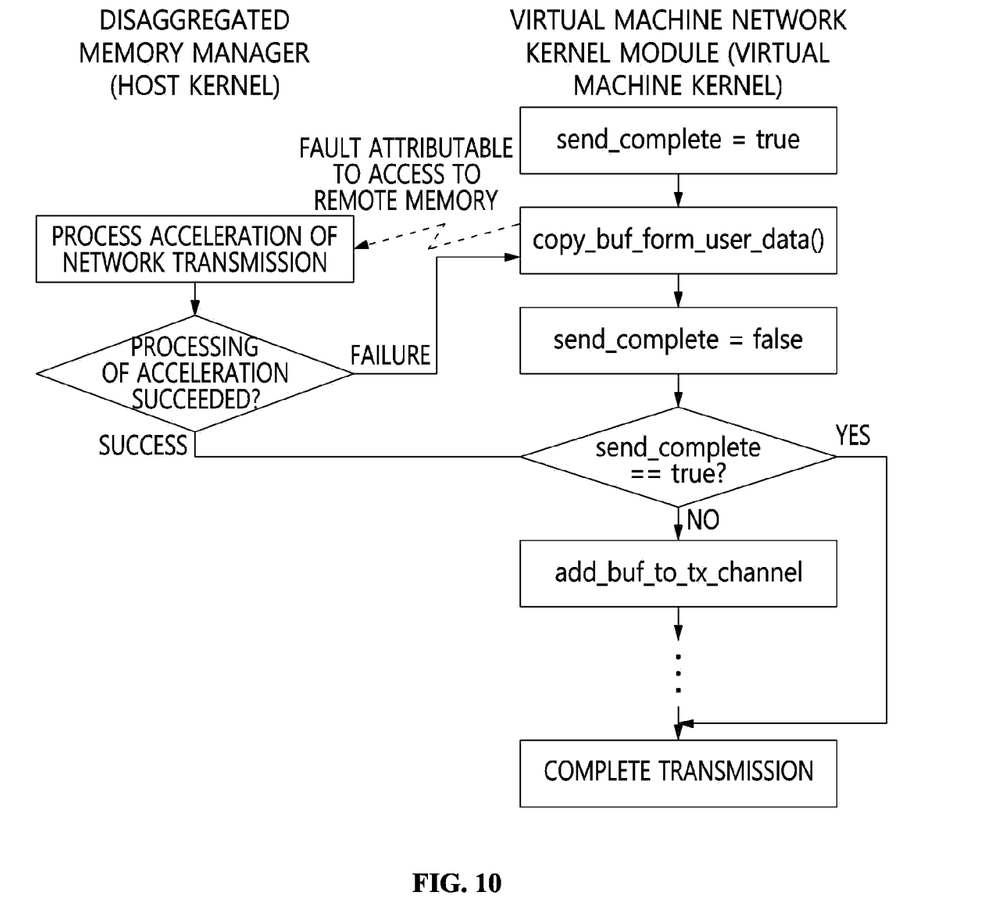
FIG. 10 is a flowchart illustrating the control transfer path of a virtual machine depending on the processing of network acceleration by a disaggregated memory manager.

FIG. 10 is a flowchart illustrating a control transfer path for a virtual machine depending on the processing of network acceleration by a disaggregated memory manager.

Referring to FIG. 10, the disaggregated memory manager performs an emulation task of revising the context of a virtual machine so as to provide notification that a user data copy task that was previously suspended on the virtual machine has been completed, and network transmission has been terminated. Thereafter, control is handed over to the virtual machine network kernel module, and the virtual machine network kernel module recognizes that copy of user data to the buffer and network transmission have been terminated, and notifies a user program that network transmission has been terminated. As illustrated in FIG. 8, depending on the success or failure of processing in the case where processing of acceleration is terminated, when acceleration processing succeeds depending on the success of processing, the virtual machine network kernel module may recognize that data transmission has succeeded, whereas when acceleration processing fails, the virtual machine network kernel module resumes the task of copying user data to the buffer, thus accelerating network transmission.

Figure 11:
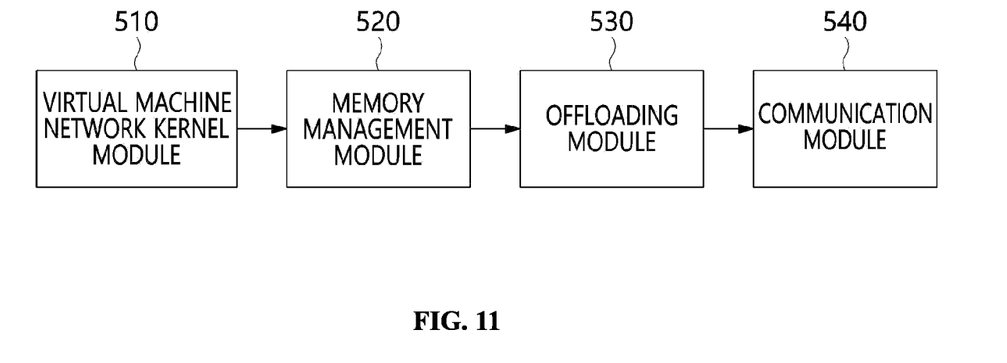
FIG. 11 is a block diagram illustrating a computing node according to an embodiment of the present disclosure.

FIG. 11 is a block diagram illustrating a computing node according to an embodiment of the present disclosure.

Referring to FIG. 11, the computing node in a memory-disaggregated environment according to an embodiment of the present disclosure includes a virtual machine network kernel module 510 for copying transmission data to a transmission buffer, a disaggregated memory management module 520 for, when a page fault occurs during the copy of the transmission data, identifying the location where the transmission data is stored in the memory-disaggregated environment, an offloading module 530 for setting a node in which a largest amount of transmission data is stored as a transmission node, and a communication module 540 for sending a transmission command to the transmission node.

Here, the transmission command may include at least one of the transmission data stored in local memory, configuration information of the transmission data, or the IP address of the computing node, or a combination thereof.

Here, the transmission command may control the transmission node to request the transmission data from an additional node in which the transmission data is stored by utilizing the configuration information of the transmission data, and to transmit complete transmission data.

Here, the transmission command may control the transmission node to change a transmitter (source) IP address to the IP address of the computing node, and then to transmit the transmission data to the IP address.

Here, when the transmission node corresponds to the computing node, the communication module 540 may receive the transmission data from the memory node, and may transmit the complete transmission data.

Here, the configuration information of the transmission data may include node information about the node in which the transmission data is stored, and information about pieces of transmission for respective nodes.

Figure 12:
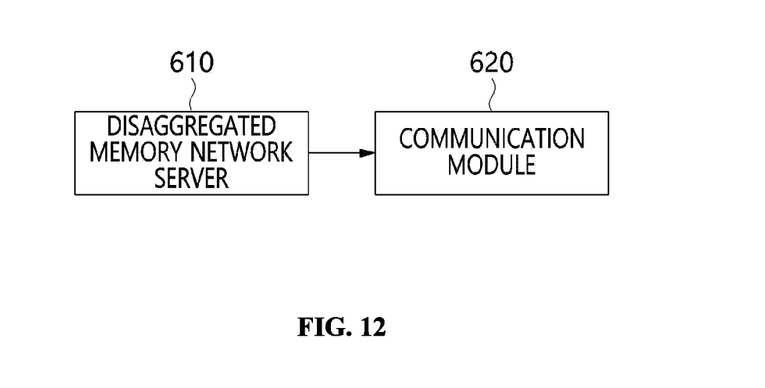
FIG. 12 is a block diagram illustrating a memory node according to an embodiment of the present disclosure.

FIG. 12 is a block diagram illustrating a memory node according to an embodiment of the present disclosure.

Referring to FIG. 12, the memory node in a memory-disaggregated environment according to an embodiment of the present disclosure includes a communication module 620 for receiving a transmission command from a computing node on which a virtual machine is running, and sending transmission data in response to the transmission command, and a disaggregated memory network server 610 for configuring complete transmission data using the configuration information of the transmission data. Here, the transmission command may include at least one of transmission data stored in local memory of the computing node, the configuration information of the transmission data, or the IP address of the computing node, or a combination thereof.

Here, the transmission command may be received in the case where a largest amount of transmission data is stored in the memory node.

Here, the communication module 620 may request transmission data from an additional node in which the transmission data is stored, using the configuration information of the transmission data.

Here, the memory node in the memory-disaggregated environment according to an embodiment of the present disclosure may further include an IP spoofing module for changing the transmitter (source) IP address into the IP address of the computing node.

Figure 13:
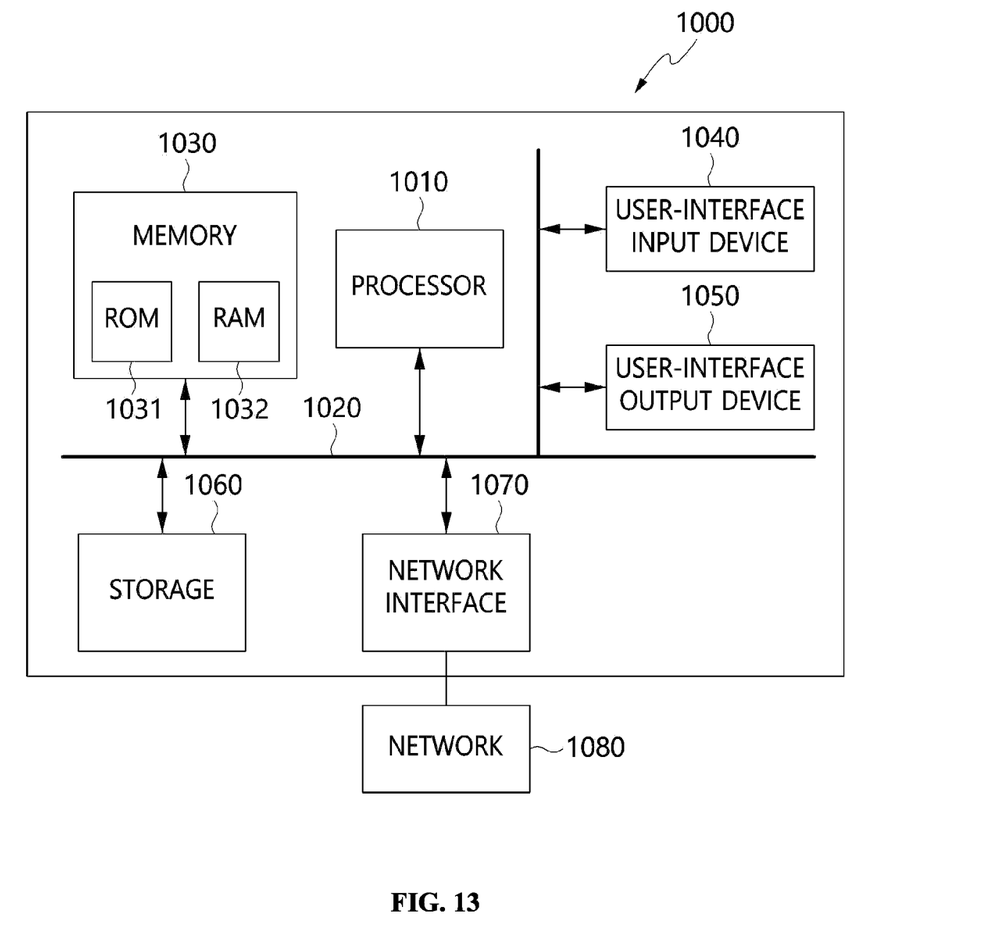
FIG. 13 is a diagram illustrating the configuration of a computer system according to an embodiment.

FIG. 13 is a diagram illustrating the configuration of a computer system according to an embodiment.

An apparatus for accelerating network transmission in a disaggregated-memory system according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060.

Each of the memory 1030 and the storage 1060 may be a storage medium including at least one of a volatile medium, a nonvolatile medium, a removable medium, a non-removable medium, a communication medium or an information delivery medium, or a combination thereof. For example, the memory 1030 may include Read-Only Memory (ROM) 1031 or Random Access Memory (RAM) 1032.

Specific executions described in the present disclosure are embodiments, and the scope of the present disclosure is not limited to specific methods. For simplicity of the specification, descriptions of conventional electronic components, control systems, software, and other functional aspects of the systems may be omitted. As examples of connections of lines or connecting elements between the components illustrated in the drawings, functional connections and/or circuit connections are exemplified, and in actual devices, those connections may be replaced with other connections, or may be represented by additional functional connections, physical connections or circuit connections. Furthermore, unless definitely defined using the term "essential", "significantly" or the like, the corresponding component may not be an essential component required in order to apply the present disclosure.

In accordance with the present disclosure, a short delay time and a wide network transmission bandwidth may be provided in a memory-disaggregated environment.

Further, the present disclosure may improve the utilization of local memory in a memory-disaggregated environment.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A method for accelerating network transmission, the method accelerating network transmission in a memory-disaggregated environment including a computing node, on which a virtual machine is running, and a memory node, the method comprising:
copying transmission data to a transmission buffer of the computing node;
when a page fault occurs during copy of the transmission data, identifying a location at which the transmission data is stored;
setting a node in which a largest amount of transmission data is stored as a transmission node; and
sending a transmission command to the transmission node.

2. The method of claim 1, wherein the transmission command includes at least one of transmission data stored in a local memory of the computing node, configuration information of the transmission data, or an IP address of the computing node, or a combination thereof.

3. The method of claim 2, wherein the transmission node requests the transmission data from an additional node in which the transmission data is stored by utilizing the configuration information of the transmission data, and sends complete transmission data.

4. The method of claim 2, wherein the transmission node changes a transmitter IP address to the IP address of the computing node, and then sends the transmission data to the IP address of the computing node.

5. The method of claim 1, wherein, when the transmission node corresponds to the computing node, the transmission node receives the transmission data from the memory node, and sends the complete transmission data.

6. The method of claim 2, wherein the configuration information of the transmission data includes information about a node in which the transmission data is stored, and information about pieces of transmission data for respective nodes.

7. A computing node in a memory-disaggregated environment, comprising:
- a virtual machine network kernel module configured to copy transmission data to a transmission buffer;
- a disaggregated memory management module configured to, when a page fault occurs during copy of the transmission data, identify a location at which the transmission data is stored in the memory-disaggregated environment;
- an offloading module configured to set a node, in which a largest amount of transmission data is stored between a computing node and a memory node, as a transmission node; and
- a communication module configured to send a transmission command to the transmission node.

8. The computing node of claim 7, wherein the transmission command includes at least one of transmission data stored in local memory, configuration information of the transmission data or an IP address of the computing node, or a combination thereof.

9. The computing node of claim 8, wherein the transmission command controls the transmission node to request the transmission data from an additional node in which the transmission data is stored by utilizing the configuration information of the transmission data and to send complete transmission data.

10. The computing node of claim 8, wherein the transmission command controls the transmission node to change a transmitter IP address to the IP address of the computing node, and then to transmit the transmission data to the IP address of the computing node.

11. The computing node of claim 7, wherein, when the transmission node corresponds to the computing node, the communication module receives the transmission data from the memory node, and sends the complete transmission data.

12. The computing node of claim 8, wherein the configuration information of the transmission data includes information about a node in which the transmission data is stored, and information about pieces of transmission data for respective nodes.

13. A memory node in a memory-disaggregated environment, comprising:
- a communication module configured to receive a transmission command from a computing node on which a virtual machine is running, and send transmission data in response to the transmission command; and
- a disaggregated memory network server configured to configure complete transmission data using configuration information of the transmission data,
- wherein the transmission command includes at least one of transmission data stored in a local memory of the computing node, configuration information of the transmission data, or an IP address of the computing node, or a combination thereof.

14. The memory node of claim 13, wherein the transmission command is received in a case where a largest amount of transmission data is stored in the memory node.

15. The memory node of claim 13, wherein the communication module requests the transmission data from an additional node in which the transmission data is stored by utilizing the configuration information of the transmission data.

16. The memory node of claim 13, further comprising:
- an IP spoofing module configured to change a transmitter IP address to the IP address of the computing node.

* * * * *